UNITED STATES PATENT OFFICE.

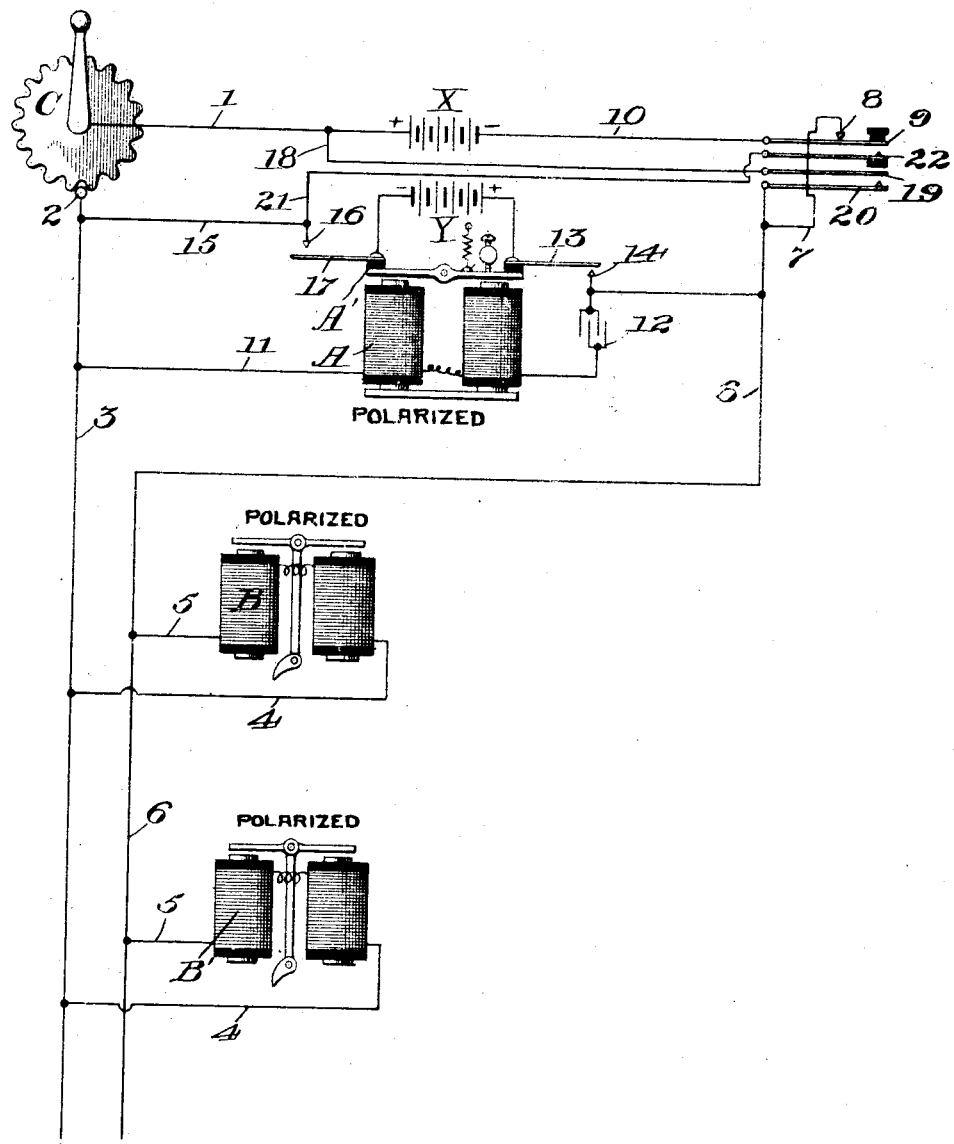

SAMUEL A. NORSTROM, OF CHICAGO, ILLINOIS, ASSIGNOR TO CASPER L. REDFIELD, OF CHICAGO, ILLINOIS.

TELEPHONE-EXCHANGE.

No. 871,042.  Specification of Letters Patent.  Patented Nov. 12, 1907.

Application filed July 13, 1905. Serial No. 269,440.

*To all whom it may concern:*

Be it known that I, SAMUEL A. NORSTROM, a citizen of the United States of America, and a resident of Chicago, county of Cook, and State of Illinois, have invented certain new and useful Improvements in Telephone-Exchanges, of which the following is a specification.

My invention relates to telephone exchanges and has for its object provision of means by which magnets used for operating switching mechanisms are relieved of their residual magnetism so that their armatures will not stick to them when the circuit for operating them is broken.

In the accompanying drawing, I have illustrated a party line exchange in which the upper part shows so much of the central office apparatus as is necessary to an explanation, and the lower part shows the operating magnets of two local stations. In telephone exchanges having automatic operations, these operations are performed by magnets through which electrical impulses are sent by an operator. In the kind of exchange chosen for illustration, the operator is located at a central office and each local station is provided with a switching mechanism operated by a magnet. When the operator sends an impulse in one direction over the line it causes the switching mechanisms to be advanced by their magnets, and when she sends one in the opposite direction it causes the switching mechanisms to be released so that they may return to their normal positions. In operating exchanges of this kind an occasional trouble arises from an armature sticking to its magnet, thus causing the switching mechanism where this occurs to fail to make its proper movement. I overcome this trouble by causing each operating impulse to be automatically followed by an impulse in the releasing direction of such short duration that it is without effect on the magnets other than to relieve them of their residual magnetism. I accomplish this result by providing at the central office an extremely sensitive magnet, preferably high wound, a condenser of large capacity, and an extra battery. These parts are connected to the other central office devices in the manner shown.

To operate the exchange the operator turns the crank of the calling device C, making a series of connections to the point 2. Each time such connection is made a current flows:— X—1—C—2—3—4— of each station—B—B¹ etc., —5—6—7—8—9—10—X. This is the current used to operate the magnets B, B¹, etc., so as to advance their switching mechanisms. A branch of this current flows from 3 by way of 11 through magnet A to the condenser 12, which becomes charged in consequence thereof. This current through A is in a direction which will hold the armature A¹ against its stop, but when the connection is broken between C and 2 the condenser is discharged in the opposite direction through A. Owing to the large capacity of the condenser 12, and the sensitive nature of the magnet A, this discharge is sufficient to move the armature A¹ so that the insulated springs thereon will make a brief connection with the adjacent contact points. When this occurs a current flows:— Y—13—14—6—5— of each station-magnets— 4—3—15—16—17—Y. This is a current in the opposite direction through the magnets B, B¹ etc., which destroys their residual magnetism due to the operating current and effectually prevents their armatures from sticking. The length of time during which this circuit is held, however, is so brief that it is broken before the armatures of the magnets B, B¹ etc. have moved any appreciable distance, and consequently it does not cause release.

The operation for release is performed by pressing key 9 when a current flows:— X—18—19—20—6—5— B—4—3—15—21—22—9—10—X. This current is the same in direction as that from battery Y but differs from it by being held long enough to cause an operation of the magnets at the local stations. This is a natural result of hand operation, it being difficult to close and open this connection quickly enough to prevent mechanical operations of the local station magnets.

What I claim is:—

1. The combination with a magnet provided with connections by which electrical impulses may be sent through said magnet, of automatically operating means by which each such impulse through said magnet is followed by a second impulse sent in the opposite direction through the magnet, the duration of said second impulse being sufficient to destroy the residual magnetism in said magnet but insufficient to cause its operation in the opposite direction.

2. The combination with a polarized magnet adapted to be operated in opposite directions by currents flowing in opposite directions through it, and a battery and connections for sending impulses in one direction through said magnet, of automatically operating means by which each such impulse is followed by a battery impulse in the opposite direction but of a duration insufficient to cause a magnet movement in the opposite direction.

3. The combination with a polarized magnet, a battery, and means by which impulses in a given direction are sent from said battery through said magnet, of a second magnet, and means by which upon completing an impulse through the first magnet said second magnet will cause a brief impulse of the kind described to flow in the opposite direction through the first mentioned magnet.

4. The combination with a polarized magnet, a battery, and connections by which impulses in a given direction are sent from said battery through said magnet, of a second magnet and a condenser bridged across said connections, means by which the discharge of said condenser will cause said second magnet to close an electrical connection of very short duration, and means by which such closure will send a brief impulse in the opposite direction through the first mentioned magnet.

Signed at Chicago, Ill., this 7th day of July 1905.

SAMUEL A. NORSTROM.

Witnesses:
A. L. BUCHANAN,
C. L. REDFIELD.